(12) United States Patent
El-Wardany et al.

(10) Patent No.: US 10,005,144 B2
(45) Date of Patent: Jun. 26, 2018

(54) BROACH TOOL RAKE FACE WITH A TAILORED SURFACE TOPOGRAPHY

(71) Applicant: United Technologies Corporation, Farmington, CT (US)

(72) Inventors: Tahany I. El-Wardany, Bloomfield, CT (US); Wayde R. Schmidt, Pomfret Center, CT (US)

(73) Assignee: United Technologies Corporation, Farmington, CT (US)

( * ) Notice: Subject to any disclaimer, the term of this patent is extended or adjusted under 35 U.S.C. 154(b) by 0 days. days.

(21) Appl. No.: 15/601,392

(22) Filed: May 22, 2017

(65) Prior Publication Data

US 2017/0252840 A1  Sep. 7, 2017

Related U.S. Application Data

(62) Division of application No. 14/200,853, filed on Mar. 7, 2014, now Pat. No. 9,656,335.

(60) Provisional application No. 61/775,128, filed on Mar. 8, 2013.

(51) Int. Cl.
| | |
|---|---|
| *B23D 43/02* | (2006.01) |
| *B23P 15/42* | (2006.01) |
| *B23D 43/00* | (2006.01) |
| *B23F 21/26* | (2006.01) |
| *B23F 21/24* | (2006.01) |

(52) U.S. Cl.
CPC ............. *B23D 43/02* (2013.01); *B23P 15/42* (2013.01); *B23D 2043/025* (2013.01); *B23F 21/24* (2013.01); *B23F 21/26* (2013.01); *Y10T 407/16* (2015.01)

(58) Field of Classification Search
CPC .. B23D 2043/025; B23D 43/02; B23D 37/00; B23D 43/00; B23F 21/24; B23F 21/26; B23F 21/241; B23F 21/243; B23F 21/245; B23F 21/246; B23F 21/248; B23F 21/262; B23F 21/264; B23F 21/266; B23F 21/268; B23P 15/42
See application file for complete search history.

(56) References Cited

U.S. PATENT DOCUMENTS

| 93,212 | A | * | 8/1869 | Lutz et al. | ................ B23C 5/08 407/115 |
|---|---|---|---|---|---|
| 1,235,604 | A | * | 8/1917 | Royle | ........................ B23C 5/10 407/30 |
| 2,274,491 | A | * | 2/1942 | Mentley | ................... B23F 21/28 407/27 |
| 2,322,894 | A | * | 6/1943 | Stevens | ................... B23B 51/02 408/230 |

(Continued)

FOREIGN PATENT DOCUMENTS

| DE | 102009033619 | 1/2011 |
|---|---|---|
| FR | 2801234 | 6/1999 |
| GB | 2483475 | 3/2012 |

OTHER PUBLICATIONS

P. Koshy et al. "Performance of electrical discharge textured cutting tools", CIRP Annals, vol. 60, Issue 1, 2011, pp. 153-156.

(Continued)

*Primary Examiner* — Sara Addisu
(74) *Attorney, Agent, or Firm* — O'Shea Getz P.C.

(57) ABSTRACT

A broach tool includes a broach tool rake face with a tailored surface topography.

5 Claims, 9 Drawing Sheets

(56) References Cited

U.S. PATENT DOCUMENTS

| | | | |
|---|---|---|---|
| 2,636,327 A | 4/1953 | Stephan | |
| 2,645,471 A * | 7/1953 | King | E21C 35/183 175/435 |
| 2,846,193 A * | 8/1958 | Chadderdon | E21B 29/00 166/55.7 |
| 3,227,008 A | 1/1966 | Celovsky | |
| 3,461,748 A | 8/1969 | Meyer | |
| 3,641,642 A * | 2/1972 | Schmidt | B23D 43/04 407/11 |
| 4,383,784 A | 5/1983 | Gulbrandsen | |
| 4,710,069 A * | 12/1987 | Loqvist | B23B 27/143 407/114 |
| 4,826,365 A * | 5/1989 | White | B23B 51/02 269/285 |
| 4,902,395 A * | 2/1990 | Yoshimura | C23C 14/0635 419/26 |
| 5,027,914 A * | 7/1991 | Wilson | E21B 10/26 166/55.6 |
| 5,074,720 A * | 12/1991 | Loqvist | B23C 5/202 407/114 |
| 5,075,181 A * | 12/1991 | Quinto | B23B 27/145 407/113 |
| 5,160,232 A * | 11/1992 | Maier | B23B 51/02 407/54 |
| 5,197,837 A | 3/1993 | Brown | |
| 5,246,320 A * | 9/1993 | Krippelz, Jr. | B23D 37/04 409/244 |
| 5,250,367 A * | 10/1993 | Santhanam | B23B 27/148 407/119 |
| 5,265,985 A * | 11/1993 | Boppana | B23B 27/143 407/114 |
| 5,364,209 A * | 11/1994 | Santhanam | B23B 27/148 407/113 |
| 5,396,818 A | 3/1995 | Fitzgerald | |
| 5,525,016 A * | 6/1996 | Paya | B23B 27/141 407/116 |
| 5,702,808 A * | 12/1997 | Ljungberg | C23C 16/403 407/119 |
| 5,722,803 A * | 3/1998 | Battaglia | B23B 27/146 407/115 |
| 5,741,130 A | 4/1998 | Hagstrom et al. | |
| 5,743,681 A * | 4/1998 | Wiman | B23B 27/143 407/114 |
| 5,750,247 A * | 5/1998 | Bryant | C22C 29/067 407/119 |
| 5,934,844 A * | 8/1999 | Woolley | B23B 27/143 407/114 |
| 5,967,710 A * | 10/1999 | Krenzer | B23B 27/141 407/114 |
| 6,047,430 A | 4/2000 | Redden | |
| 6,050,752 A * | 4/2000 | DeRoche | B23C 5/202 407/114 |
| 6,132,151 A | 10/2000 | Courmier | |
| 6,209,509 B1 | 4/2001 | Kammeraad et al. | |
| 6,217,264 B1 * | 4/2001 | Kim | B23B 27/143 407/114 |
| 6,447,218 B1 * | 9/2002 | Lagerberg | B23B 27/10 407/114 |
| 6,447,890 B1 * | 9/2002 | Leverenz | C23C 16/36 407/119 |
| 6,470,846 B1 | 10/2002 | Kammeraad et al. | |
| 6,508,150 B1 | 1/2003 | Bertschinger | |
| 6,524,036 B1 * | 2/2003 | Kolker | B23B 27/143 407/113 |
| 6,599,061 B1 * | 7/2003 | Nelson | B23B 27/143 407/114 |
| 6,612,787 B1 * | 9/2003 | North | C22C 29/08 407/118 |
| 6,676,339 B2 * | 1/2004 | Hartlohner | B23B 27/143 407/114 |
| 6,712,564 B1 * | 3/2004 | Hughes | B23B 27/164 407/119 |
| 6,739,808 B1 * | 5/2004 | Ghosh | B23B 27/22 407/107 |
| 6,827,975 B2 * | 12/2004 | Leverenz | C23C 16/36 427/249.1 |
| 7,121,772 B2 * | 10/2006 | Krahula | B23B 27/143 407/113 |
| 7,137,583 B2 * | 11/2006 | Kammerer | B02C 13/28 241/197 |
| 7,217,073 B2 | 5/2007 | Carpenter et al. | |
| 7,419,336 B2 * | 9/2008 | Lehto | B23C 5/1045 407/113 |
| 7,458,753 B1 * | 12/2008 | Niebauer | B23B 27/143 407/113 |
| 7,677,843 B2 * | 3/2010 | Techel | A01F 29/09 407/113 |
| 7,736,102 B2 | 6/2010 | El-Wardany et al. | |
| 7,805,824 B2 | 10/2010 | El-Wardany et al. | |
| 7,827,661 B2 | 11/2010 | El-Wardany et al. | |
| 8,000,942 B2 * | 8/2011 | El-Wardany | B23D 43/04 703/1 |
| 8,070,396 B2 * | 12/2011 | Koskinen | B23D 43/04 407/13 |
| 8,388,274 B2 * | 3/2013 | Chen | B23B 27/143 407/113 |
| 8,647,022 B2 * | 2/2014 | Campbell, Jr. | B23D 43/04 407/15 |
| 8,708,617 B2 * | 4/2014 | Choi | B23B 27/007 407/103 |
| 9,144,845 B1 * | 9/2015 | Grzina | B23B 27/00 |
| 9,539,658 B2 * | 1/2017 | Eigenmann | B23D 77/02 |
| 9,731,354 B2 * | 8/2017 | Kondameedi | B23B 27/005 |
| 2002/0136611 A1 * | 9/2002 | Hartlohner | B23B 27/143 407/114 |
| 2004/0198206 A1 * | 10/2004 | Toge | B24B 53/017 451/547 |
| 2004/0265075 A1 * | 12/2004 | Kolker | B23B 27/145 407/113 |
| 2007/0077130 A1 * | 4/2007 | Ley | B23B 27/1607 407/114 |
| 2008/0229893 A1 | 9/2008 | Shepard et al. | |
| 2009/0274524 A1 * | 11/2009 | Hidai | B24D 7/063 407/34 |
| 2010/0310329 A1 * | 12/2010 | Harif | B23B 27/045 408/1 R |
| 2012/0087751 A1 * | 4/2012 | Yamaguchi | B23B 27/143 407/115 |
| 2012/0107061 A1 * | 5/2012 | Harif | B23B 27/1611 407/61 |
| 2013/0302102 A1 | 11/2013 | Green et al. | |
| 2015/0375312 A1 * | 12/2015 | Mandrile | B23D 37/12 409/244 |
| 2017/0252840 A1 * | 9/2017 | El-Wardany | B23D 43/02 |

OTHER PUBLICATIONS

Tovey, Josh, "Electrical Discharge Texturing of Cutting Tools" A Thesis Submitted to the School of Graduate Studies in Partial Fulfillment of the Requirements for the Degree Master of Applied Science McMaster University, Sep. 2010.

Jing Ni et al. "Investigation on broaching performance and unloading mechanism of micro-textured broach", The International Journal of Advanced Manufacturing Technology, Oct. 2016, vol. 86, Issue 9-12, pp. 2449-2458|.

\* cited by examiner

| Speed / Load | Low | Medium | High | |
|---|---|---|---|---|
| Low | | | | Regime I: seals, thrust bearings |
| Medium | | Regime II | | |
| High | Regime III: piston-liner, transmission, bearings | | | |

*FIG. 6*

| Texture (dimple) density | 7.5% | 15% | 30% |
|---|---|---|---|
| Low Speed | X | X | |
| Medium Speed | | X | |
| High Speed | | | X |

*FIG. 7*

| Pattern and sliding directions | Depth (μm) | Radius (μm) | Area of a dimple (μm²) | Pitch (μm) | Area ratio (%) |
|---|---|---|---|---|---|
| Ellipse (circles) | 8 | 75 | 17671 | 500 | 7 |
| Ellipse | 8 | 150/37.5 | 17671 | 500 | 7 |
| Triangle | 8 | 188 (slide length) | 17671 | 500 | 7 |

| Speed m/s | 0.1 | 0.2 | 1 | 2 |
|---|---|---|---|---|
| Texture shape | Circle | Triangle | Ellipse | Ellipse |

FIG. 8

| | Method/Finishing | Shape | Orientation to sliding direction | Diameter/width (dimple) (μm) | Pitch (μm) | Depth (μm) | Ra (μm) |
|---|---|---|---|---|---|---|---|
| Pattern 1 | Machine process | Groove | Perpendicular | 500 | 1,000 | 45-50 | 0.54-0.67 |
| Pattern 2 | Machine process | Groove | Parallel | 500 | 1,000 | 45-50 | |
| Pattern 3 | Machine process | Mesh | | 500 | 1,000 | 45-50 | |
| Pattern 4 | Shot blast | Groove | Perpendicular | 60 | 90 | 6-10 | 0.04-0.08 |
| Pattern 5 | Shot blast | Groove | Parallel | 60 | 90 | 6-10 | |
| Pattern 6 | Shot blast | Dimple | | 60 | 90 | 6-10 | |
| Pattern 7 | Shot blast | Dimple | Rotating 45° | 60 | 90 | 6-10 | |
| Flat 1 | Polishing | | | | | | 0.04 |
| Flat 2 | Grinding | | | | | | 0.31 |

| Speed m/s | 0.1 | 0.2 | 0.5 | 1 |
|---|---|---|---|---|
| Texture shape | Pattern 6 | Pattern 6 | Pattern 6 | Pattern 3 |
| | | | Pattern 7 | Pattern 6 |

FIG. 9

BROACH TOOL RAKE FACE WITH A TAILORED SURFACE TOPOGRAPHY

This patent application is a divisional of and claims priority to U.S. patent application Ser. No. 14/200,853 filed Mar. 7, 2014, which claims priority to U.S. Patent Appln. No. 61/775,128 filed Mar. 8, 2013. The '853 application and the '128 application are each hereby incorporated herein by reference in its entirety.

BACKGROUND

This present disclosure relates generally to a broach tool and methodology for designing broach tool rake surfaces.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The compressor and turbine sections include components that rotate at high speeds, which subject the components to significant centrifugal loads. One component that rotates at high speeds is a disk that carries multiple circumferentially arranged rotor blades. The blades are typically attached at an outer circumference of the disk through respective blade attachment slots. Each of the slots has a profile that corresponds with the root of the blade, and has a configuration designed to retain the blade in the slot. The blade attachment slots are generally of a "fir-tree" configuration to increase the load bearing surface area. Broaching is a process often utilized to machine the fir-tree slots.

Limitations of known broach processes associated with aerospace materials may include excessive material strain hardening, surface microstructure alteration (such as white etched layer and bend microstructures), slot deformation due to high friction forces affecting dimension accuracy of the slot, and ripple formation on the slot surfaces.

SUMMARY

A broach tool according to one disclosed non-limiting embodiment of the present disclosure includes a broach tool rake face with a tailored surface topography.

A further embodiment of the present disclosure includes, wherein the tailored surface topography is a laser surface treatment.

A further embodiment of any of the foregoing embodiments of the present disclosure includes, wherein the tailored surface topography is laser hardened.

A further embodiment of any of the foregoing embodiments of the present disclosure includes, wherein the tailored surface topography is formed by particles.

A further embodiment of any of the foregoing embodiments of the present disclosure includes, wherein the tailored surface topography is Electro-Discharge Machined.

A method for manufacturing a broach tool according to one disclosed non-limiting embodiment of the present disclosure includes identifying an application regime for which a tailored surface topography is to be used; determining the tailored surface topography for the application regime; and selecting an appropriate processing method to form the tailored surface topography.

A further embodiment of any of the foregoing embodiments of the present disclosure includes identifying a high speed, low load application regime relationship.

A further embodiment of any of the foregoing embodiments of the present disclosure includes identifying a high-medium speed and medium load application regime relationship.

A further embodiment of any of the foregoing embodiments of the present disclosure includes identifying a low-medium speed and high load application regime relationship.

A further embodiment of any of the foregoing embodiments of the present disclosure includes determining a shape factor for the tailored surface topography.

A further embodiment of any of the foregoing embodiments of the present disclosure includes determining a pitch, pattern design for the tailored surface topography.

A further embodiment of any of the foregoing embodiments of the present disclosure includes determining an orientation for the tailored surface topography.

A further embodiment of any of the foregoing embodiments of the present disclosure includes selecting a high energy deposition method to form the tailored surface topography.

A further embodiment of any of the foregoing embodiments of the present disclosure includes selecting a cold spray method to form the tailored surface topography.

A further embodiment of any of the foregoing embodiments of the present disclosure includes selecting a kinetic metallization method to form the tailored surface topography.

A further embodiment of any of the foregoing embodiments of the present disclosure includes selecting a plasma deposition method to form the tailored surface topography.

A further embodiment of any of the foregoing embodiments of the present disclosure includes selecting an electron-beam based method to form the tailored surface topography.

A further embodiment of any of the foregoing embodiments of the present disclosure includes alternating between subtractive and additive processing methods to form the tailored surface topography.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 6 is a table of the relationship between speed and load of the tailored surface topography;

FIG. 7 is a table of the relationship between speed and tailored surface topography density;

FIG. 8 is a table of the relationship between speed and tailored surface topography shape; and FIG. 9 is a table of the relationship between speed and tailored surface topography pattern.

DETAILED DESCRIPTION

Figure 1:
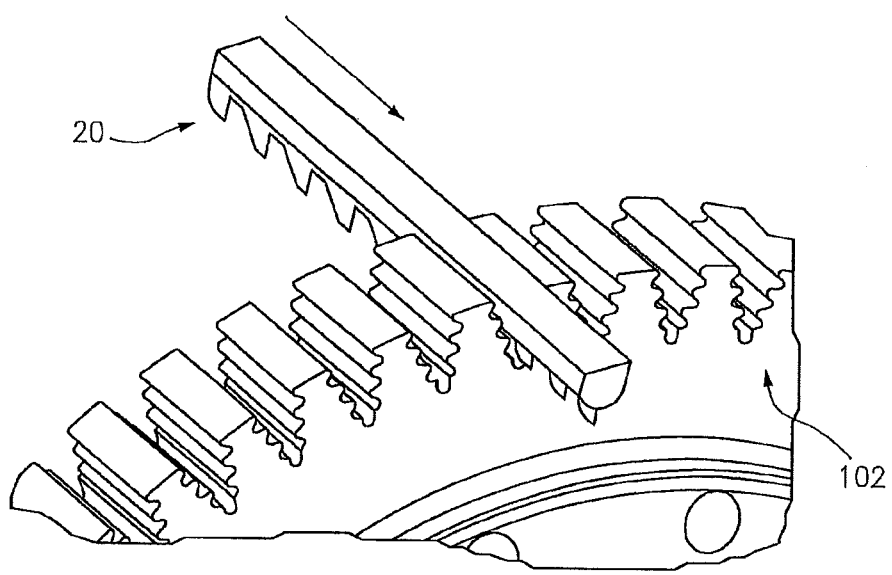
FIG. 1 is a schematic perspective view of a broach tool.
Figure 2:
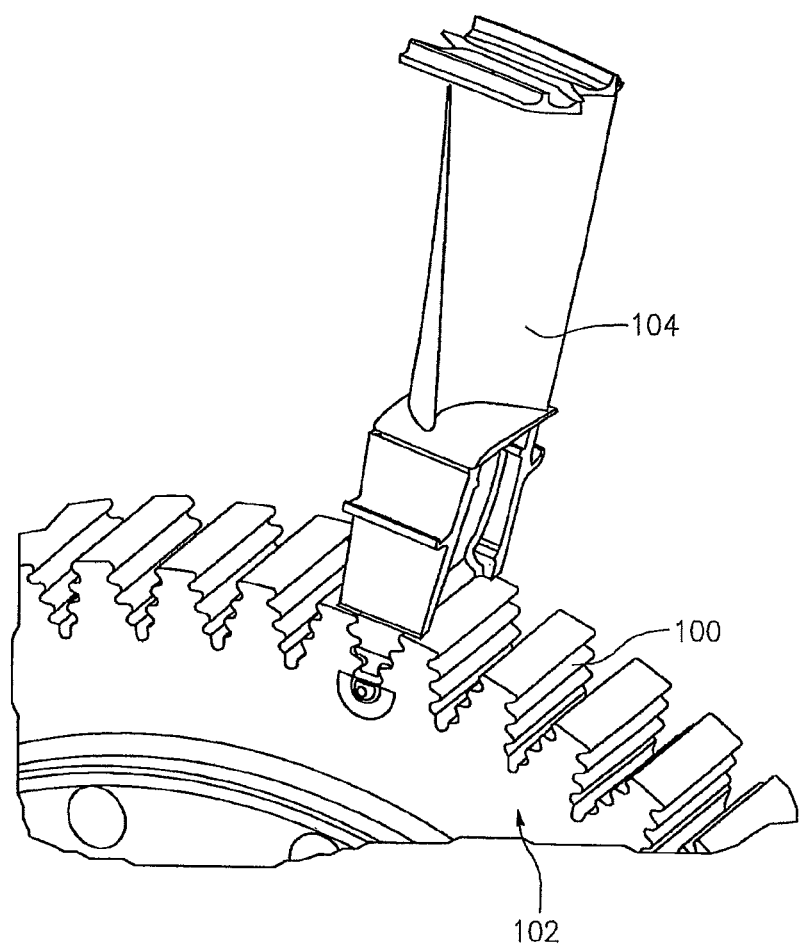
FIG. 2 is a schematic view of a rotor disk with broach machined fir-tree slots.

FIG. 1 schematically illustrates a broach tool 20 that may be utilized to, for example, broach machined fir-tree slots 100 in a disk 102 that is manufactured of, for example, an aerospace superalloy such as titanium (Ti), steel, and/or nickel (Ni) to receive a respective rotor blade 104 (one shown; FIG. 2). In a typical broaching process the broach tool 20 includes a series of cutting teeth that are pulled through a workpiece to remove material and form the desired slot. Each cutting tooth of the series of cutting teeth is typically slightly different from the adjacent cutting teeth, and the broach tool is designed to gradually remove material from the workpiece at an interface.

Figure 3:
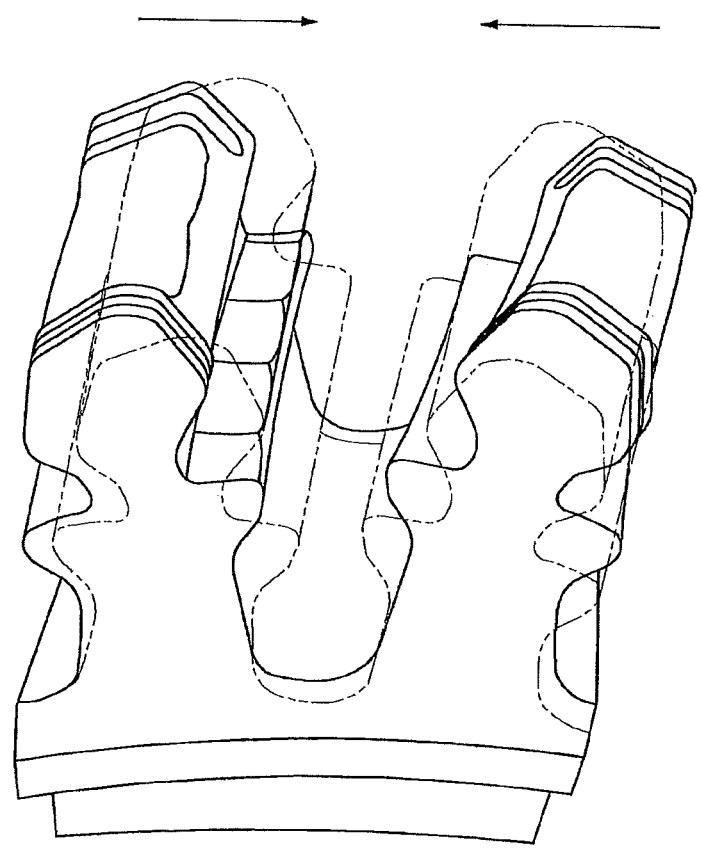
FIG. 3 is a schematic view of a broach machined fir-tree slot illustrating a deflection thereof during broaching.

Friction occurs at the interface between a rake face of the broach tool 20 and the chips generated during metal removal. The rake face friction may adversely influence the chip formation process and may consume about 25% of the total cutting energy. The amplitude of a normal force value depends to a great extent on the coefficient of friction between the broach tool and the chips or workpiece that may approach a value as high as 1 due to, for example, the lower feed rate (broach speed). While a main cutting force directional component has a major effect in the deformation of the broach tool teeth, the force perpendicular to the main cutting force directional component has a significant influence on slot deformation (FIG. 3). In particular, the broaching of aerospace material may experience relatively high forces in both the cutting and normal directions that may result in excessive material strain hardening, surface microstructure alteration and slot deformation, as well as reduce broach tool life due to premature (or excessive) teeth wear.

Figure 4:
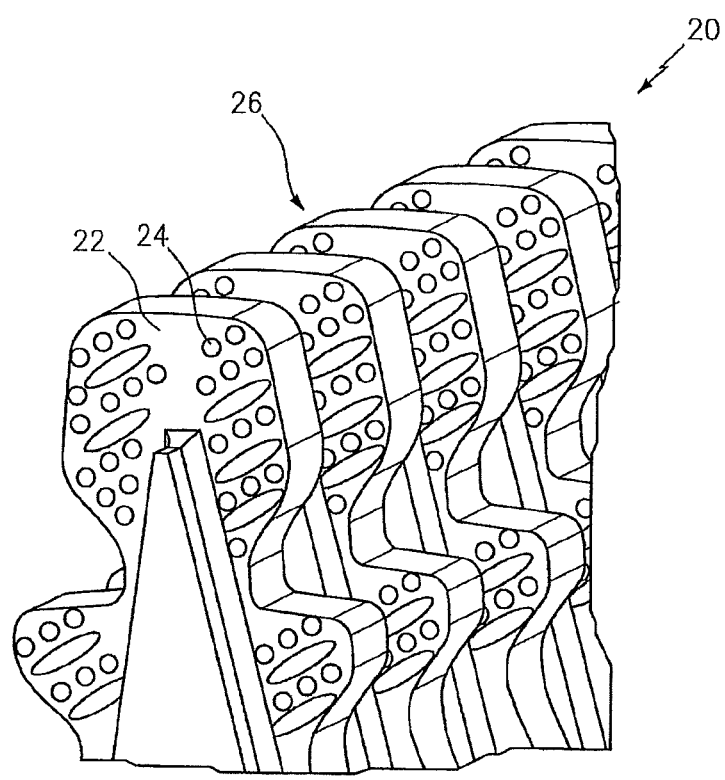
FIG. 4 is a face view of a broach tool with a tailored surface topography.

Application of a tailored surface topography 24 to a rake face 22 carried by each tooth 26 (FIG. 4) operates to reduce the coefficient of friction. This tailored surface topography 24 is selected to reduce the friction forces and reduce the potential for slot deformation, leading to a better control of slot geometry. In addition, the reduction of the friction force component will allow the broach tool 20 to be engaged with less strain to the workpiece material and will reduce the generated cutting force and consequently further reduce stress, strain and slot deflection.

Figure 5:
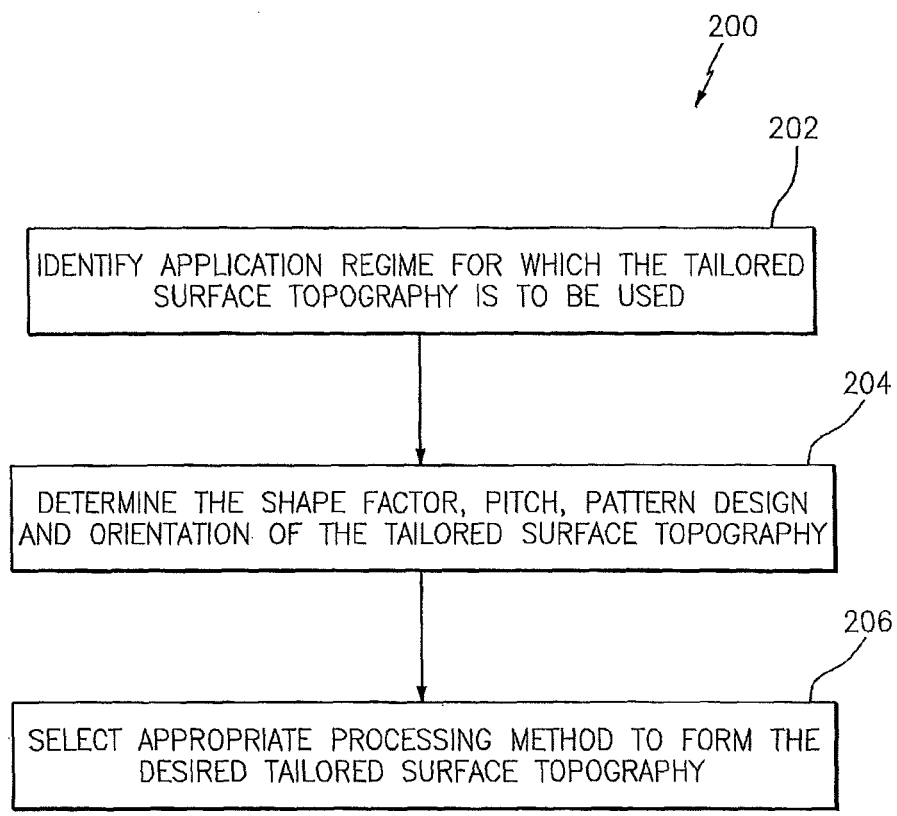
FIG. 5 is a method of determining a tailored surface topography.

With reference to FIG. 5, a method 200 to define the tailored surface topography 24 is related to the broaching speed and the generated load (FIG. 6). The method 200 facilitates the development of the tailored surface topography 24. That is, the predetermined broaching speed and the generated load defines the tailored surface topography 24.

Initially, an application regime relationship (Step 202; FIG. 5) for which the tailored surface topography 24 is to be used is selected. It should be appreciated that various regions may alternatively or additionally be defined. Regime I is identified as high speed, low load. The tailored surface topography 24 is thereby tailored primarily to control lubricant flow. Regime II is identified as high-medium speed and medium load, wherein the tailored surface topography 24 is thereby tailored primarily to control the combined effects of lubricant hydrodynamics and contact mechanics. Regime III is identified as low-medium speed and high load. The tailored surface topography 24 is thereby tailored primarily to control the combined effects of contact mechanics and lubricant compressibility to trap wear particles and control the friction coefficient. The tailored surface topography 24 can be formed through a combination of subtractive and additive processing methods, including, for example, surface texturing through change to the surface microstructure or chemistry. Non-limiting subtractive methods that involve use of thermal energy based removal processes to remove material include electrical discharge machining (EDM) and laser machining. For example, specially designed EDM die sinker media may be utilized to carbonize the broach tool rake face 22 of each tooth 26 to increase the surface hardness of the broach tool as well as to generate the desired surface textures. In another example, laser machining may also be used to alter the properties of the broach tool rake face 22 to resist failure during sliding contact. Laser texturing has demonstrated, through experimental verification, a one-third reduction in the coefficient of friction. In yet another example, ultrasonic impact machining induces sufficient kinetic energy into each individual impact element to generate both surface texture and sub-surface body deformations.

Next, the tailored surface topography 24 is determined (Step 204). The tailored surface topography 24 may be defined by, for example, shape, pitch, pattern design, density, orientation and others. Furthermore, the feature density (FIG. 7), shape (FIG. 8) and pattern (FIG. 9) of the tailored surface topography 24 may be related to broach tool speed based on the application regime.

The tailored surface topography 24 includes an array of features to retain lubricant or machining debris, e.g. depressed wells, microchannels, grooves, pockets, dimples, pyramids, ovals, etc., including combinations thereof. The array of features may also be provided to operate as a controlled heat transfer medium such as a heat sink. Experimental data may be utilized to facilitate the definition of the tailored surface topography 24.

Next, the appropriate processing method to form the determined tailored surface topography 24 is selected (Step 206). For example, laser surface treatments can be used to selectively ablate features from sub-micron to millimeter size. In addition to material removal, laser surface treatment may be used to selectively and locally induce desired additional hardness or compositional changes. Laser processes may also be used to deposit thin layers of complex features made from, for example, aluminum oxide, tungsten carbide particles or other characteristically hard or wear/abrasion resistant materials.

Other processing methods that may be used to selectively produce surface topography include high energy deposition methods such as cold spray or kinetic metallization, plasma deposition or electron-beam based methods. Such methods can be used in combination with appropriate masking to control the precise location of the surface structures.

Another processing method to form the determined tailored surface topography 24 includes Electrical-Discharge (die sinker) machining. In this method, a graphite, copper or other suitable electrode with a designed pattern is used to 'burn away' the features on the metal workpiece. With appropriate masking, selective etching may be used to form microstructural and composition changes in the broach tool rake face 22. It should be appreciated that various machine operations may alternatively or additionally be utilized.

Another processing method to form the determined tailored surface topography 24 includes 'soft lithographic' or direct write methods to selectively position features as small as several tens of nanometers. Again, with appropriate masking and subsequent processing (e.g. etching or thermal treatment), residual surface features may be defined on the broach tool rake face 22.

Yet other processing methods suitable for forming the determined tailored surface topography 24 include water-jet based processes. It should be appreciated that various other process methods will benefit herefrom.

The tailored surface topography 24 facilitates lubricant flow distribution, prevents seizure/scoring, reduces the coefficient of friction between tool surface and chips produced as well as extends the operational life of the broaching tool 30. The tailored surface topography 24 has demonstrated experimentally the reduction of slot deflection and surface strain to provide an approximate 50% reduction of the normal force component. The various tailored surface topography 24 configurations have been demonstrated via orthogonal machining application. The tailored surface topography 24 also reduces production costs by increasing the broach tool life since the cost of tooling is one of the major factors in the broaching process It should be understood that like reference numerals identify corresponding or similar elements throughout the several drawings. It should also be understood that although a particular component arrangement is disclosed in the illustrated embodiment, other arrangements will benefit herefrom.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A broach tool comprising:
    a broach tool rake face with a tailored surface topography, wherein the tailored surface topography includes a combination of depressed wells, microchannels, grooves, pockets, dimples, pyramids and ovals formed in the broach tool rake face that control a coefficient of friction between the broach tool rake face and a workpiece.

2. The broach tool as recited in claim 1, wherein said tailored surface topography is formed by a laser surface treatment.

3. The broach tool as recited in claim 1, wherein said tailored surface topography is formed by laser texturing.

4. The broach tool as recited in claim 1, wherein said tailored surface topography is formed by Electrical-Discharge Machining.

5. The broach tool as recited in claim 1, wherein the broach tool is configured to machine a fir-tree slot in the workpiece.

\* \* \* \* \*